Dec. 17, 1963  T. J. THOMPSON  3,114,834
VISIBLE LIGHT TRANSPARENT NUCLEAR SCINTILLATION
DETECTOR FOR FLUENT MATERIAL
Filed May 2, 1960  2 Sheets-Sheet 1

INVENTOR.
THEOS J. THOMPSON
BY *Rines and Rines*

Dec. 17, 1963 T. J. THOMPSON 3,114,834
VISIBLE LIGHT TRANSPARENT NUCLEAR SCINTILLATION
DETECTOR FOR FLUENT MATERIAL
Filed May 2, 1960 2 Sheets-Sheet 2

INVENTOR.
THEOS J. THOMPSON
BY
*Rines and Rines*

United States Patent Office 3,114,834
Patented Dec. 17, 1963

3,114,834
VISIBLE LIGHT TRANSPARENT NUCLEAR SCINTILLATION DETECTOR FOR FLUENT MATERIAL
Theos J. Thompson, 14 Everett Ave., Winchester, Mass.
Filed May 2, 1960, Ser. No. 26,251
9 Claims. (Cl. 250—71)

The present invention relates to nuclear-radiation detectors and, more particularly, to detectors of the scintillation type; the present application being filed in response to a Patent Office requirement for restriction in co-pending patent application Serial No. 590,933, now Patent No. 3,005,100, filed June 12, 1956, for Nuclear-Radiation Detector and Method.

Liquid, gaseous and solid scintillation counters are currently employed to detect nuclear radiations, as described, for example, in Nucleonics, McGraw-Hill, April 1956, pages 33 to 53, and in the said copending application. The term "nuclear radiations," as used herein, is intended to embrace charged particles and radiations including particles and radiations emitted by a nucleus in the process of any nuclear tansition including $\alpha$, $\beta$ particles and $\gamma$ radiation, fission fragments and the like. In some scintillation-counting systems, a small crystal of scintillation material is disposed within or exposed through the wall of a gas or fluid-filled chamber to nuclear radiations within the chamber. A photomultiplier or similar detector monitors the scintillation radiations emitted from the scintillation material in response to the impingement of nuclear radiations thereupon. In such systems, the scintillation counter will, thus, only sample, for example $\alpha$ or $\beta$ nuclear radiations produced in a small volume of the chamber which may not be a representative sample of the nuclear radiation distribution throughout the chamber and, at best, provides a relatively weak counting action. Relatively low counting efficiency is thus obtained. Other types of scintillators, moreover, including liquid scintillators, are not well adapted for representatively sampling $\alpha$ and $\beta$ particles and the like with gaseous or other fluid media.

In accordance with the disclosure of the said parent application, improved results are obtained with the aid of scintillation material disposed within a fluid medium containing nuclear radiations to be detected and extending along and contacting an appreciable portion of the fluid medium to produce scintillation radiations in response to nuclear radiations in an appreciable portion of the fluid medium. Monitor means is provided sensitive to the scintillation radiations for receiving the same and producing an indication of such reception, providing for a truly representative count and a high counting efficiency.

An object of the present invention is to provide a new and improved nuclear-radiation detector of the scintillation type that is particularly suitable for use in the apparatus disclosed in the said co-pending application, and is more generally of use, also, in other radiation-detecting systems, as well.

A further object is to provide scintillation counter components that shall provide high counting efficiencies.

Another object is to provide a scintillation counter of particularly high sensitivity to $\alpha$ and $\beta$ particles and other highly ionizing particles.

Other and further objects will be explained hereinafter and will be more particularly pointed out in the appended claims.

The invention will now be described in connection with the accompanying drawings, FIG. 1 of which is a longitudinal section of a chamber containing scintillation material that may be constructed in a preferred configuration and dimensioned in accordance with a preferred embodiment of the invention, illustrated as applied to the system described in the said co-pending application;

Figure 1:
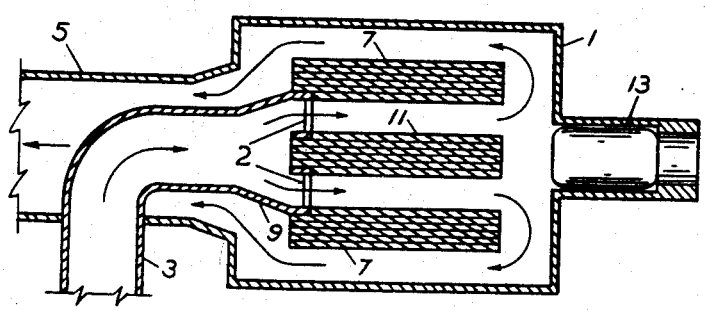

Referring to FIG. 1, a chamber 1 is shown provided with a re-entrant inlet 3 and an outlet 5 for permitting the circulation within the chamber 1 of a fluid medium containing nuclear radiations to be detected, such as an air medium. The term "fluid," as used in the specification and claims, includes both gases and liquids. The invention is particularly useful with gaseous media. While, moreover, a fluid-circulating system is disclosed, it is to be understood that the chamber 1 may be filled with a fluid medium and then closed off for radiation-detection measurements, being later emptied.

In accordance with the teachings of the said co-pending application, scintillation material, preferably of the solid type, such as of plastic material, is disposed within and extends along the chamber 1 throughout an appreciable portion of the volume of the fluid medium therein or surrounds appreciable fluid-medium volumes. Through this construction, the nuclear radiations in an appreciable portion of the fluid medium, as contrasted with the before-described prior-art minute sampling, act upon the scintillation material and produce large cumulative scintillation radiation effects. The scintillation material in FIG. 1 is shown in the form of a hollow cylinder 7 extending from the diverging mouth 9 of the inlet 3 along the major portion of the chamber 1. Between the spaced inner walls of the cylinder 7 a further solid scintillation member 11, of co-axial cylindrical or other geometrical shape, may be axially supported by means of, for example, radial struts or supporting members 2 as of plastic and even scintillation material itself. Appreciable portions of the fluid-medium volume, therefore, are juxtaposed to the inner and outer surfaces of the scintillation member 7 and the parallel outer surfaces of the scintillation member 11, providing a very large sampling of the nuclear radiation in the fluid medium. A counting geometry of almost $4\pi$ can, indeed, be obtained. When the fluid medium circulates in the channels or spaces between the inner walls of the member 7 and the outer walls of the member 11 and then along the outer walls of the member 7, as shown by the arrows, the nuclear radiations associated with the fluid medium will result in the emission of photons in the scintillation members 7 and 11, producing, for example, scintillation light radiation. This scintillation radiation produced in response to the nuclear radiations in an appreciable portion of the fluid medium may be received or monitored at the end of the chamber 1 by a photomultiplier tube circuit 13 which can produce an electrical indication of the scintillation phenomenon representative of the nuclear radiations in the fluid medium. In view of the above-described construction, very high counting efficiencies are obtained. Particularly high sensitivities to $\alpha$ and $\beta$ particles are thereby provided.

The novel plurality of generally co-extensive spaced scintillation surfaces and preferred geometric arrangement thereof, while assisting in obtaining the large sampling results above-described and claimed in the said co-pending application, are also of broader utility in other types of counting or indicating systems, and constitute one of the features of the present invention, apart from the particular complete system in which it is described as used in the said co-pending application and in FIG. 1 hereof.

Suitable solid scintillation materials that can be molded or fabricated in the desired configurations of the present invention includes, for example, polystyrene plastic with para-terphenyl, polyvinyl toluene plastic with paraterphenyl, and anthracene, to mention but a few. The material of the present invention should preferably be light-transmitting, as can be effected with such plastic materials, in order to permit scintillation light radiations from all parts of the scintillation members to reach the phototube 13.

Figure 2:
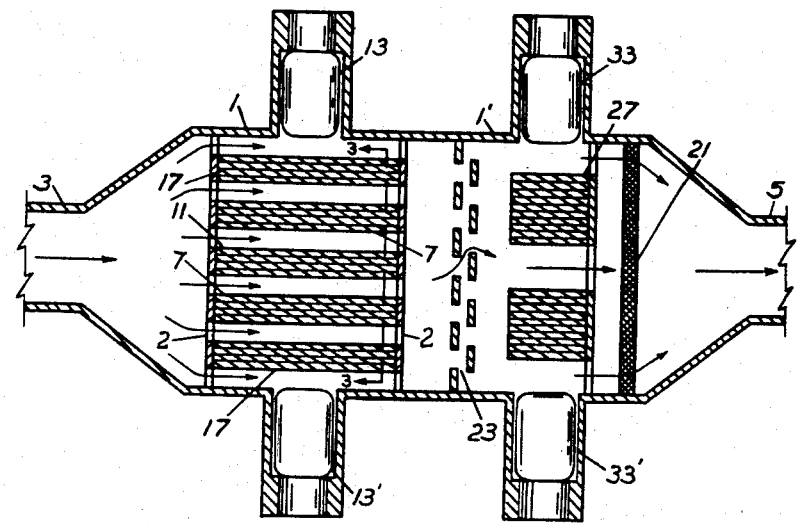
FIG. 2 is a similar view of a modification.
Figure 3:
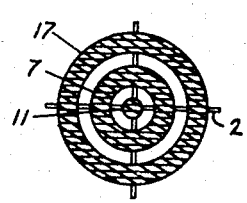
FIG. 3 is a section taken upon the line 3—3 of FIG. 2, looking in the direction of the arrows.

In the left-hand portion of the system of FIG. 2 and in FIG. 3 a further concentric outer cylindrical scintillation member 17 is shown spaced from and surrounding the scintillation cylinder 7 and the inner scintillation member 11, the members being supported by the before-mentioned supports 2 within the chamber 1. Even greater sampling of the nuclear radiations in the fluid medium is thus achieved in view of the greater area of scintillation material juxtaposed to the fluid medium. A pair of phototubes 13, 13' are shown disposed in the side walls of the chamber 1, monitoring the scintillation radiations. The system of FIG. 1 could similarly be monitored at the side walls of the chamber 1. The light-transmitting scintillation material of the members 11, 7, 17 will permit the phototubes 13, 13' to receive the scintillation radiations from all parts of the scintillation members.

If it is desired to monitor particulate matter which is radioactive, a filter 21, as of glass wool and the like, may be employed, as described in the said co-pending application and as shown in the right-hand chamber portion 1' of FIG. 2. While the chamber portion 1' is shown as an extension of the left-hand chamber 1, being separated therefrom by a fluid-medium-transmitting but light-blocking-baffling structure 23, it may be an entirely separate chamber completely disassociated from the chamber 1. The chamber portion 1' could then be used as a gas or fluid monitor for radioactive particulate matter. A scintillation cylinder 27 may be mounted adjacent the filter 21 within the chamber 1' to be subjected to the nuclear radiations from the particles trapped by the filter 21. The filter may, if desired, through adjustment of its mesh, selectively trap radiation-carrying particles of predetermined sizes.

As hereinafter explained, in accordance with another important feature of the present invention, the thickness of the walls of the scintillation material 7, 11, 27, etc. may be adjusted to produce selective response to predetermined radiations and radiation energy limits. Again, side-wall phototube monitors 33 and 33' may be employed.

Figure 6:
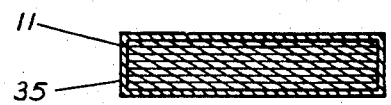
FIG. 6 is a side elevation of a preferred modified scintillation member that may be dimensioned in accordance with a feature of the present invention.

In the systems of FIGS. 1 and 2, and the hereinafter-described embodiments, the chambers, as explained in the said co-pending application, are rendered light-tight, as with the aid of well-known baffles and the like, similar, for example, to the baffles 23 of FIG. 2. The walls of the chamber, moreover, and, indeed, selected portions of the surfaces of the scintillation material itself may be lined with light-reflecting linings further to reflect and direct the scintillation radiations to the phototubes. All of the scintillation members of the present invention, moreover, may be provided with a thin layer or layers of nuclear and photon radiation-transmitting material, such as a thin plastic layer 35, as of transparent polyethylene or polystyrene, shown associated with the scintillation member 11 in FIG. 6, which may be removed and replaced after a period of use to effect de-contamination of the apparatus.

Figure 4:
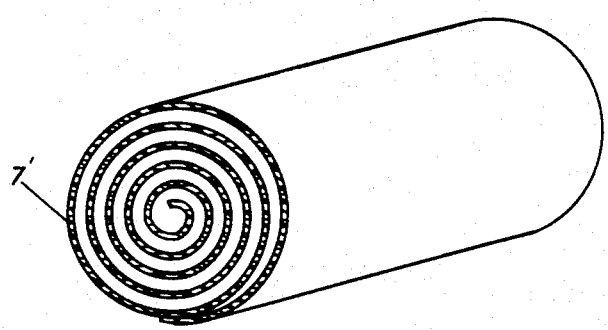
FIGS. 4 and 5 are views of further modifications.

In the case of $\alpha$-particle nuclear radiations, which can produce scintillation effects in very thin scintillation-material layers, scintillation members of extreme thinness may, in accordance with a feature of the present invention, be employed, even of the order of mils; say one to five mils, more or less. This provides for the use of a large number of surfaces of scintillation material and extremely high counting efficiency. Another convenient configuration for such use may be a cylindrical surface wound in spiral form, as shown at 7' in FIG. 4.

Thicker-walled scintillation members are adapted for $\beta$-particle nuclear radiations; $\beta$-particle radiations of low energy levels, say with a maximum energy of about 0.2 mev., requiring scintillation members, in accordance with this invention, of substantially 0.1 millimeter thickness, more or less, and $\beta$ radiations of high energy levels, say of the order of 1 or 2 mev., requiring thicker members of substantially 1 centimeter, more or less. The present invention is thus adapted, by the control of the thickness and position of the scintillation members, to respond somewhat selectively to radiations of predetermined energy levels.

Figure 5:
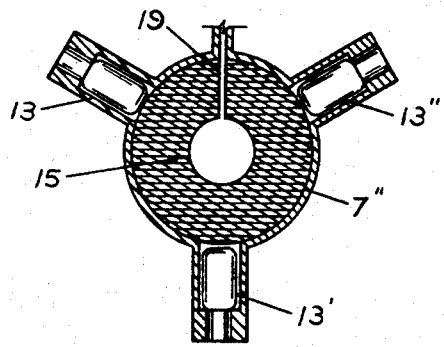

Radiation particles of the $\gamma$ type, on the other hand, have a relatively long penetration distance so that as thick a scintillation member as possible is desirable. In actual practice, a compromise between the total amount of scintillation material and the extent of the sample of the fluid-medium volume to be monitored is effected. A system such as the thick-walled spherical scintillation-material chamber 7" of FIG. 5 may be used containing a cavity 15 into which the fluid medium may be fed by an inlet 19. A plurality of equal-angular spaced phototubes 13, 13' and 13" may then be employed.

Further modifications will occur to those skilled in the art and all such are considered to fall within the spirit and scope of the invention as defined in the appended claims.

What is claimed is:

1. A device for producing scintillations in response to nuclear radiation, said device consisting of a plurality of generally co-extensive walls of solid nuclear-radiation scintillation material separated by open space to define a passage therebetween, said walls having substantially parallel inner and outer surfaces of said nuclear-radiation scintillation material and being of predetermined thickness.

2. The device of claim 1, said walls being formed of light-transmitting material.

3. The device of claim 1, said walls being formed of material selected from the group consisting of anthracene, polystyrene with para-terphenyl, and polyvinyl toluene with para-terphenyl.

4. The device of claim 1, said walls being cylindrical.

5. The device of claim 1, said walls constituting a plurality of co-axial cylinders.

6. The device of claim 1, said walls having curved inner and outer surfaces.

7. The device of claim 1, said walls constituting a spirally wound sheet.

8. The device of claim 1, the thickness of said walls being within the range of from tenths of a millimeter to centimeters, whereby the scintillation material responds selectively to beta-particle radiations.

9. The device of claim 1, the thickness of said walls being of the order of several mils, whereby the scintillation material selectively responds to alpha-particle radiations.

References Cited in the file of this patent

UNITED STATES PATENTS

| | | |
|---|---|---|
| 2,636,993 | Jakobson | Apr. 28, 1953 |
| 2,666,145 | Eversole | Jan. 12, 1954 |
| 2,725,484 | McKee | Nov. 29, 1955 |
| 2,799,780 | Ruderman | July 16, 1957 |
| 2,910,592 | Armistead | Oct. 27, 1959 |
| 2,961,541 | Ruderman | Nov. 22, 1960 |

OTHER REFERENCES

Scintillation Counting—1956, Nucleonics, vol. 14, No. 4, April 1956, pages 33 to 64.